United States Patent Office 3,350,414
Patented Oct. 31, 1967

3,350,414
DERIVATIVES OF TETRAHYDROFURAN
Perry A. Argabright, Cranford, N.J., assignor to Esso Research and Engineering Company, a corporation of Delaware
No Drawing. Filed June 19, 1962, Ser. No. 203,655
17 Claims. (Cl. 260—347.7)

The present invention relates particularly to cyclic ethers having a high $NF_2$ content, such as tetrakis, difluoraminotetrahydrofuran and furan derivatives of higher $NF_2$ content. These furan derivatives are new and useful in rocket propellants as oxidizer components.

The present application is a continuation-in-part of U.S. applications Serial No. 77,471 and Serial No. 77,467 of Perry A. Argabright, filed December 21, 1960 both now abandoned.

The present invention is concerned with techniques for reacting furan, a cyclic ether having a conjugated pair of double bonds with tetrafluorohydrazine, $N_2F_4$, to form desired derivatives containing at least one $NF_2$ group per carbon atom in the furan ring nucleus and for recovering these desired compounds. These cyclic $CNF_2$ compounds are made in good yield and are potent oxidizers of desired physical properties, such as low vapor pressure, high thermal stability, and capability of imparting high specific impulse performance to rocket propellant compositions.

The reactant furan is a commercially available material. High purity furan has a boiling point of close to 32°C. under atmospheric pressure. It is regarded as having the following structure:

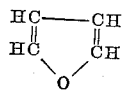

Furan is a 5-member heterocyclic compound having oxygen as the hetero-atom in its ring and having conjugated double bonds. This arrangement is termed the furan nucleus.

Techniques found useful in accordance with the present invention for linking $NF_2$ groups to the furan nucleus are also applicable to substituted furan derivatives. The substituted furan derivatives of interest may have one or more substituent groups replacing hydrogen attached to the furan nucleus. Preferably, the substituent groups are organic functional groups that have a double bond conjugated with the double bond in the furan nucleus that contains carbon linked to nitrogen, oxygen, or both, and that remain unchanged during the reaction of the substituted furan with $N_2F_4$. In this regard, suitable functional groups are carbomethoxy, carbonyl halide, isocyanate, carboxy, carbonitrile, and carboxaldehyde groups. These substituted furan derivatives have differences in properties that impose the need for certain modifications within the general principles herein described.

The products that form by reaction of furan and its derivatives with $N_2F_4$ have differences in properties and uses.

Separate U.S. applications, Serial No. 77,462 and Serial No. 77,465, filed December 21, 1960, by Passannante et al. and Michael et al. pertain more specifically to the mono-functional and the bi-functional furan derivatives, respectively.

To form good yields of the difluoramino derivatives of furan having at least one $NF_2$ group per C, precautions are taken to avoid explosive reaction and to minimize or prevent undesired polymerization or tar formation.

A technique found useful in preventing tar formation during the reaction of furan with $N_2F_4$ involves treating the reactor, particularly a glass reactor, with nitric acid followed by vacuum drying of the reactor at flame temperature. This treatment of the inner wall of the reactor prevents the presence of such basic or acidic materials which promote tar formation.

Another technique found useful for preventing tar formation in the reaction of furan and its derivatives with $N_2F_4$ involves steps to maintain a suitably uniform temperature throughout the reactor. There is evidence that cold spot condensation of intermediate reaction products on the walls of the reactor leads to tar formation.

The reaction of furan and various derivatives thereof with $N_2F_4$ can be carried out in the vapor, liquid, or mixed phase and in a static or flow system.

In general, the reaction of furan with $N_2F_4$ proceeds satisfactorily at a temperature above 100° C., preferably in the range of about 135° C. to 450° C. The reaction period or residence time, usually in the range of about 1 to 24 hours, varies inversely to the temperature.

Lowering of the reaction temperature substantially below 135° C., especially with increased pressure, has been indicated to lead to tar formation and unsatisfactory reaction.

Increasing the reaction temperature into the range of about 185° C. to about 450° C. makes the reaction of furan with $N_2F_4$ even more selective toward the formation of tetrakis ($NF_2$) furan. Products containing even more than one $NF_2$ per C may be formed. With the increased reaction temperatures, the reaction period may be lowered to a matter of a few minutes.

The pressure in the reaction zone may be subatmospheric to about atmospheric or superatmospheric, e.g. in the range of 5 to about 3000 p.s.i.a. Selection of pressure depends on various factors, such as the system, apparatus, furan reactant proportion of $N_2F_4$, diluent, and temperature of reaction. For example, in using a glass reactor and a temperature in the range of 135° to 185° C., with or without a diluent, a subatmospheric pressure of 5 to 14.7 p.s.i.a. may be used. In using a pressure-resistant reactor, e.g. stainless steel, a high concentration of $N_2F_4$, a suitable diluent, and a superatmospheric pressure may be used. The reactor surface to volume ratio is also a factor.

There are differences in the suitabilities of diluents. A halogenated hydrocarbon, particularly carbon tetrachloride, has been found to be superior to hydrocarbons, e.g. benzene.

The $N_2F_4$ is generally used in a proportion of at least 2 mols per mol of the furan compound, i.e. at least stoichiometric proportion, for addition of 4 $NF_2$ groups to the 4 carbon atoms in the furan nucleus. At moderate temperatures, which may be somewhat below 135° to 185° C. at furan/$N_2F_4$ ratios from 10 to 1, high selectivity is afforded to the bis ($NF_2$) derivative; formed by the addition of 2 $NF_2$ groups to the furan nucleus. The mol ratio of $N_2F_4$ to furan or furan derivative reactant may be increased to 10 to 1 or higher.

With the principal aim of forming the desired high-energy products containing at least 1 $NF_2$ per carbon in the furan nucleus, it is advantageous to use conditions that form the desired products with relatively small amounts of the lower adducts which contain less than 1 $NF_2$ per C in the nucleus.

If a relatively small amount of the lower $NF_2$ adduct product is formed, recovery of the higher adduct product is simplified and losses of materials are decreased.

When practical requirements make lower adducts part of the crude product, suitable steps for separating the desired product from the lower adducts are used. However, it has been found possible to use the lower adduct, particularly the bis ($NF_2$) adduct, in a second stage reaction with $N_2F_4$ to obtain products having a higher $NF_2$ content, e.g. tetrakis ($NF_2$) furan.

One suitable product separation method employs concentrated sulfuric acid for extraction of the lower adducts having an unreacted double bond in the furan nucleus. This method works well at ambient or lower temperatures in the range of $-10°$ to $30°$ C. without causing tar formation or reaction that would prevent or impair recovery of the desired products in which the furan nucleus is entirely saturated by addition of at least 4 $NF_2$ groups per carbon in the nucleus. The following examples are given on the synthesis and isolation of the desired furan derivatives having high $NF_2$ content.

Example 1

In a typical experiment, 5 millimoles furan were reacted with 11 millimoles $N_2F_4$ at $145°$ C. for 18 hours. The reaction was carried out in a glass bulb reactor (treated with $HNO_3$ prior to reaction) at a starting pressure of 620 mm. Hg. The colorless product weighed 740 mg. By nitrogen and fluorine analysis, the mixture was shown to contain 37% by weight of the diadduct (tetrakis ($NF_2$) furan). The remainder of the product is the monoadduct (bis ($NF_2$) furan). The mixture was extracted with concentrated $H_2SO_4$ at room temperature (ca. $21°$ C.) until the $H_2SO_4$ layer was no longer colored. The organic layer was distilled in vacuo at room temperature to free it from any dissolved $H_2SO_4$.

Analysis: 54.3 percent F, (theory for diadduct 55.1); 20.0 percent N (theory for diadduct 20.3); $d^{20/4}$, 1.604; $n_D^{20}$, 1.3830; $v_p$ ($23°$ C.), $<1$ mm.

The infrared spectrum of this purified product was in agreement with the $N_2F_4$ diadduct structure.

Through the addition of 2 moles of $N_2F_4$ to the furan, the resulting diadduct structure is obtained:

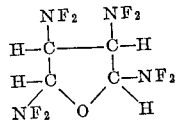

The diadduct thus formed from furan has a high ratio of $NF_2$ per molecule. This compound is tetrakis ($NF_2$) furan. The vapor pressure of the diadduct is satisfactorily low compared to other kinds of tetrakis compounds. By making the tetrakis ($NF_2$) furan derivative containing 1 $NF_2$ per C, the product formed has a relatively high density which is favorable for a propellant of high relative boost velocity. The difluoraminotetrahydrofuran product has suitable stability for storage. It may be used as an oxidizer in both solid, liquid, and hybrid high-energy propellant systems.

The tetrakis ($NF_2$) adduct of furan has been found to have an extremely high thermal stability compared to other $NF_2$-containing compounds. In a $90°$ C. storage test, no decomposition was observed from the tetrakis ($NF_2$) furan adduct for over 1000 hours.

Example 2

Using as feed a reaction product obtained, as in Example 1, under low pressure, said product containing 20% of the tetrakis ($NF_2$) furan adduct and 80% of lower adducts, this feed with twice the volume of carbon tetrachloride was heated for one hour at $150°$ C. with enough added $N_2F_4$ to maintain a pressure of about 450 p.s.i. in a stainless steel autoclave (previously treated with $HNO_3$). The resulting crude product was cooled, treated with $H_2SO_4$ at room temperature, and the undissolved organic portion recovered was the desired tetrakis ($NF_2$) furan adduct. It amounted to 70% of crude product.

The two-stage operation in Example 2 demonstrated a method of increasing the yield of tetrakis ($NF_2$) product, and also of shortening the overall reaction period.

A suitable feed may also be derived from a flow reactor wherein a gaseous mixture of $N_2F_4$ and furan is allowed to react at temperatures ranging from $150°$ to $300°$ C. at contact times of from 30 seconds to 10 minutes. The gaseous products (bis and tetrakis ($NF_2$) furan) are removed by condensation and the unreacted $N_2F_4$ and furan recycled for further reaction. The reactor is a tube composed of an inert material, such as stainless steel, and heated by a strip heater provided with temperature controllers.

Example 3

To 2.63 millimoles of bis ($NF_2$) furan adduct mixed with 1.5 milliliters of $CCl_4$ diluent was added 5.72 millimoles of $N_2F_4$ in a 5 ml. capacity stainless steel autoclave (pretreated as above). The reaction mixture was heated to $150°$ C. under a pressure of about 450 p.s.i.a. for 15 hours. The amount of $N_2F_4$ reacted was 1.3 millimoles per mole of the bis adduct. The resulting product mixture obtained thus included tetrakis ($NF_2$) adduct and some higher $NF_2$ content products presumably pentakis ($NF_2$) and hexakis ($NF_2$) furan.

Example 4

To determine relationship of yield and product composition to reaction temperature, comparative tests were made on adding $N_2F_4$ to furan under a pressure of 700 mm. Hg absolute. A 2 to 1 mole ratio of $N_2F_4$ to furan was used. The results are summarized as follows:

TABLE I

| Temp., °C. | Time, Hrs. | Product Yield, percent | Percent Tetrakis | Percent Lower Adducts |
|---|---|---|---|---|
| 145 | 3 | 75 | 15 | 85 |
| 225 | 1 | 45 | 40 | 60 |
| 275 | 1 | | 54 | 46 |
| 350 | 1 | 30 | 70 | 30 |

The data summarized under Table I shows that higher temperatures are more effective in forming the furan derivatives of higher $NF_2$ content selectivity. At $130°$ C. and lower temperatures, the reaction of $N_2F_4$ with furan tends to produce lower adducts and tar (due to extensive reaction times).

The furans containing at least 1 $NF_2$ group per C in the furan nucleus are useful sought-after ingredients for rocket propellants. They greatly increase the thrust power per unit weight as measured by specific impulse, Isp. They are useful in plastisol and solid composites which contain a binder. For example, in a propellant containing 0.85% boron powder, 13.65% hydrazinium nitroformate, and 20% nitro rubber binder, 65.5% of tetrakis ($NF_2$) furan adduct gives the product a specific impulse of 277 seconds. By using the pentakis ($NF_2$) furan derivative in a similar composition with a small increase in percentage of the boron, the Isp is increased to 288.

It is not intended to limit the invention to the examples which demonstrate embodiments of the invention claimed. The invention claimed is intended to include all inherent novelty, modifications and equivalents coming within the scope and spirit of the invention.

What is claimed is:

1. Difluoramino adduct of furan having an $NF_2$ group attached to each of 2 to 4 carbon atoms in a furan nucleus.

2. Bis ($NF_2$) adduct of furan.

3. Tetrakis ($NF_2$) tetrahydrofuran.

4. A mixture of bis ($NF_2$) and tetrakis ($NF_2$) adducts of furan.

5. Process for preparing bis ($NF_2$) adduct and tetrakis ($NF_2$) adduct of furan which comprises reacting furan with $N_2F_4$ at a temperature of about $135°$ to $450°$ C., and recovering resulting adduct product.

6. Process as defined in claim 5, wherein the $N_2F_4$ is reacted with the furan in a vapor phase reaction mixture.

7. Process as defined in claim 5, wherein the resulting adduct product is condensed to a liquid, substances in the resulting liquid product which are soluble in concentrated $H_2SO_4$ at low temperatures are extracted, and the tetrakis ($NF_2$) adduct of furan which is insoluble in the $H_2SO_4$ is vacuum distilled to recover it as a separate product.

8. Process of forming tetrakis ($NF_2$) tetrahydrofuran, which comprises admixing $N_2F_4$ with furan in a ratio to react 2 moles of $N_2F_4$ per mole of furan in the resulting reaction mixture, maintaining said reaction mixture at a reaction temperature in the range of about 135° to 450° C. for a period until tetrakis ($NF_2$) tetrahydrofuran is formed by reaction of the $N_2F_4$ with the furan.

9. In the process of claim 8, maintaining the reaction mixture under a pressure in the range of 5 to 3000 p.s.i.a.

10. In the process of claim 8, carrying out reaction of the $N_2F_4$ with the furan in contact with glass reactor wall surface that is previously treated with nitric acid and then dried.

11. In the process of claim 8, carrying out reaction of the $N_2F_4$ with the furan in said reaction mixture with an inert diluent present in the mixture.

12. Process of preparing difluoramino furan derivatives containing 4 $NF_2$ groups attached to carbon atoms in the furan nucleus, which comprises reacting furan with $N_2F_4$ at a moderate reaction temperature in the range of about 100° to 185° C. to add 2 $NF_2$ groups to the furan nucleus, then reacting a resulting bis ($NF_2$) adduct of the furan with $N_2F_4$ under increased pressure above atmospheric pressure to link 2 more $NF_2$ groups to carbon atoms in the furan nucleus of the bis ($NF_2$) adduct.

13. Process of preparing furan derivatives containing 4 $NF_2$ groups attached to 4 carbon atoms in the furan nucleus, which comprises reacting bis ($NF_2$) adduct of furan with $N_2F_4$ under superatmospheric pressure to attach 2 more $NF_2$ groups to carbon atoms in the furan nucleus.

14. The process as defined in claim 13 in which the bis ($NF_2$) adduct is reacted with $N_2F_4$ in the presence of $CCl_4$.

15. Process of preparing tetrakis ($NF_2$) adduct of furan, which comprises reacting furan in vapor phase with $N_2F_4$ in a proportion to add an $NF_2$ group to each of 2 carbon atoms in the ring nucleus of the furan at a temperature in the range of 100° to 135° C., then reacting the resulting product containing bis ($NF_2$) adduct of furan with more $N_2F_4$ at a temperature in the range of 135° to 185° C. under superatmospheric pressure to form tetrakis (difluoramino) tetrahydrofuran from said bis adduct, and recovering the tetrakis (difluoramino) tetrahydrofuran.

16. In the process as defined in claim 15, reacting the bis ($NF_2$) adduct with the $N_2F_4$ in the presence of $CCl_4$ as inert diluent.

17. Process for reacting $N_2F_4$ with furan to saturate both double bonds of the furan nucleus in a single stage at a rapid rate which comprises admixing at least about 2 moles of $N_2F_4$ with each mole of furan, and heating the mixture to a reaction temperature of 225° to 450° C. under a pressure of about 5 to 14.5 p.s.i.a., for a period of between about 0.1 to 1 hour, and recovering the resulting product rich in tetrakis (difluoramino) adduct of furan and higher nitrogen and fluorine-containing $NF_2$ adduct product of the furan.

References Cited
UNITED STATES PATENTS 3,215,709  11/1965  Logothetis _____ 260—349

OTHER REFERENCES

Hoffman et al., Chem. Reviews, vol. 62, pp. 1 to 18 (1962).

NICHOLAS S. RIZZO, Primary Examiner.

L. D. ROSDOL, Examiner.

J. W. WHISLER, Assistant Examiner.